April 22, 1924.
J. H. TRAHMS
RING GAUGE
Filed March 24, 1921
1,491,444
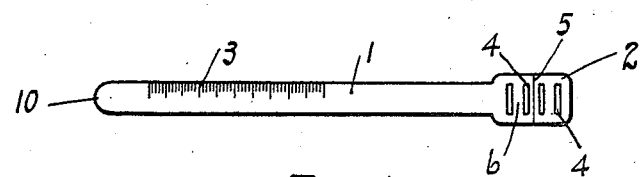
Fig. 1.
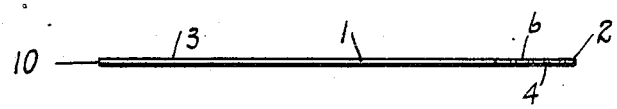
Fig. 2.
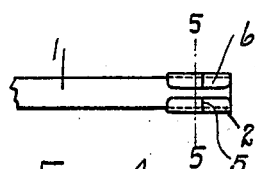 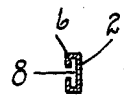 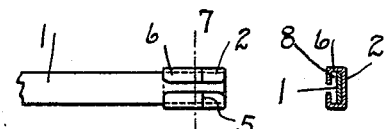
Fig. 4.   Fig. 5.   Fig. 6.   Fig. 7.
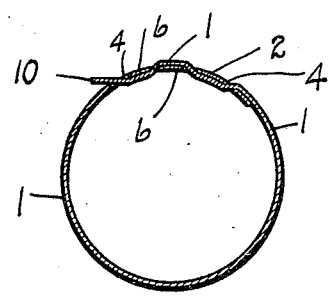
Fig. 3.
INVENTOR.
John H. Trahms
by John W. Treker
ATTORNEY.

Patented Apr. 22, 1924.

1,491,444

UNITED STATES PATENT OFFICE.

JOHN H. TRAHMS, OF CINCINNATI, OHIO, ASSIGNOR OF ONE-HALF TO LOUIS E. DORNSEIFER, OF CINCINNATI, OHIO.

RING GAUGE.

Application filed March 24, 1921. Serial No. 455,116.

*To all whom it may concern:*

Be it known that I, JOHN H. TRAHMS, a citizen of the United States, residing at the city of Cincinnati, in the county of Hamilton and State of Ohio, have invented certain new and useful Improvements in Ring Gauges, of which the following is a specification.

The object of my invention is to produce a gauge for measuring the periphery of the finger in order to determine and ascertain the size of the ring to be worn thereon; it is adjustable, having graduations thereon for selecting the proper size to fit the particular finger measured; thus any size ring can at once be selected from the stock, or any size made to order.

Thus gauge is cheap to manufacture, very simple in construction, can be readily used by anyone, and is highly efficient and accurate in use, possessing a marked degree of utility.

Under the system now in vogue it requires many trials to find the proper sized ring for the finger, generally a multiplicity of gauge rings are used and tried on the finger until the proper size is procured; this gauge ring is then placed onto and over the gauge stick in order to find the proper number of the ring in stock which coincides with the measurement just made.

My ring gauge can be made of a permanent, lasting nature, for use by jewelers and others selling rings; or it can be made for temporary use of cheap material and sent to distant points, thus enabling the perspective purchaser to measure the finger for which the ring is wanted and it can thus be ordered assuring a certainty of fit.

It is preferably made of some material which has a degree of flexibility and which will bend readily and maintain such curved or bent position and still always return to a normal flat position.

In the accompanying drawing, forming a part of this specification:

Fig. 1, is a front view of my new ring gauge,

Fig. 2, is a side view thereof,

Fig. 3, is a longitudinal section of the ring gauge when folded up to indicate the size of the ring, Fig. 4, is a view of a modified form partly broken away, Fig. 5, is a section on the line 5—5 of Fig. 4.

Fig. 6, is a view similar to Fig. 4, of another modified form, and

Fig. 7, is a section on the line 7—7 of Fig. 6.

The device consists essentially of a flat bendable piece of metal provided at one end with a head part; the metal used being preferably of a springy character, and the flat part having graduation marks thereon, and the head part being slotted or shaped to receive the end part, when the gauge is bent around into the ring form.

In the drawing 1 represents the flat part of the gauge and 2 the head thereof; the flat part carrying the graduations 3 and the head provided with a series of slots 4 generally of an elongated rectangular form and so placed that spaced retainers or locking ribs 6 will be formed between said slots. On the head 5 is placed a pointer or indicator mark 5.

In use the gauge is bent round the finger, its rounded end 10 passing through slots 4 in the head 2, as shown in Fig. 3; when the gauge has been properly fitted to the finger the graduation mark 3 which comes opposite the indicator or pointer 5 shows the proper size ring to be selected; the ring gauge in closed form can then be placed on the gauge ring stick and proper number of the ring ascertained. When the proper indication has been reached the flat piece of the indicator can be pulled out through the slots 4 and the gauge will again flatten out to a normal position. The locking or retaining ribs 6 being somewhat springy impinge against the loose end of the gauge to hold it in proper position and alignment.

In Figs. 4 and 5 the retaining strips as 6 are formed by bending the metal over to form fingers, the loose end of the gauge can be slipped in space 8 between and under said finger, which do not meet, and the graduation marks can be read at the space provided between the fingers as shown; this construction is the same as shown in Figs. 6 and 7 except that the head 2 is made separate. In the present instance one end of the gauge is rounded allowing of its easy and ready insertion into and through slots in the head which is shown widened in form; but the parts of the gauge may be made of any shape and of any contour, and while preferably made of springy, yieldable metal can be made of thin sheet celluloid, fibre, or analogous material.

While I have herein specifically described this ring gauge as adapted for measuring fingers for obtaining the proper size of rings to be worn it will be readily obvious and apparent that it can be used for measuring round sticks or bars or forms which are not absolutely round, but of oval or similar contour; in fact it can be used for measuring any rounded surfaces.

What I claim as new and my invention and desire to secure by Letters Patent is:

A ring gauge including a thin flat elongated body part of resilient material, carrying graduation marks thereon adjacent one end and at its other end provided with a head having a multiplicity of slots, and having a graduation mark thereon adapted to register with any of said graduations, the end of the elongated body part carrying the graduations being capable of passing through the slots in said head, when said gauge is placed around the periphery of a finger, the body part being of single ply throughout its length and the slots in the head being arranged in pairs, one pair of slots being located at each side of said graduation mark to permit the end of the body part carrying the graduations to be threaded first through the pair of slots between the graduation mark and the outer end of the head, over the portion of the head carrying the graduation mark and then through the pair of slots arranged between the graduation mark and the end of the body part which carries said graduations.

In testimony whereof, I affix my signature at Cincinnati, Ohio, this 21st day of March, 1921.

JOHN H. TRAHMS.